Figure 1:
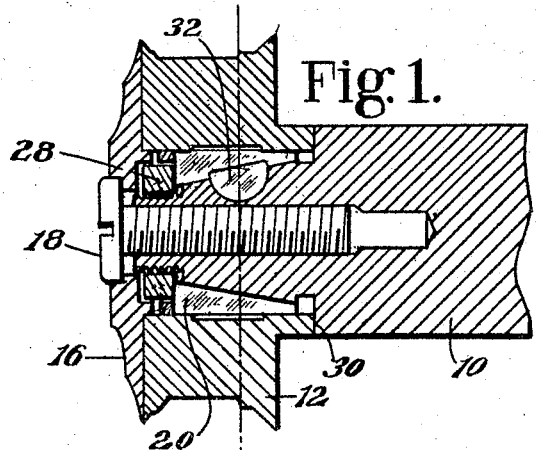

March 24, 1931.  E. J. RAY  1,797,296

CUTTER HOLDER

Filed May 5, 1924

INVENTOR
Eugene J. Ray
By his Attorney,
Nelson W. Howard

Patented Mar. 24, 1931

1,797,296

UNITED STATES PATENT OFFICE

EUGENE J. RAY, OF BEVERLY, MASSACHUSETTS, ASSIGNOR TO UNITED SHOE MACHINERY CORPORATION, OF PATERSON, NEW JERSEY, A CORPORATION OF NEW JERSEY

CUTTER HOLDER

Application filed May 5, 1924. Serial No. 711,109.

This invention relates to tool-holders, and more especially to those designed to hold and center an annular tool. A typical example of such a tool-holder is embodied in a machine for trimming the edges of shoe-soles, and the invention is herein disclosed in a structure designed for that class of work.

An object of the invention is to provide improved means for holding and centering an annular tool so that it may be demounted and replaced an unlimited number of times without doing harm to said means.

It is necessary to sharpen the cutter or cutters of an edge-trimming machine sometimes as many as twenty times a day, and to do so it is necessary to remove the cutter from its holding means. It is also necessary to substitute a cutter of another style or form whenever a change in the style of work comes to hand. Furthermore, since cutters for this kind of work are driven at very high speeds, ranging from 8000 to 12000 revolutions per minute, the utmost accuracy with regard to concentricity and balance is necessary to avoid vibration.

To meet these conditions the shaft that carries the forepart cutter of an edge-trimming machine has heretofore been formed with a tapered portion and provided with an expansible sleeve of hardened steel to grip the bore of the cutter. Saw-cuts in the sleeve provide for its expanding action, while the tightening of a screw clamps the cutter axially and at the same time causes the sleeve to slide axially on the tapered portion of the shaft and to be expanded thereby.

While the above-described construction is probably the most satisfactory heretofore used it has certain disadvantages which are avoided by the present invention. For example, to demount the cutter from the former construction it is necessary to release the expanded sleeve so that it will contract to its normal diameter; every time a cutter is put on or taken off the expansible sleeve wears the tapered portion of the shaft; the frequent expansion and contraction of the sleeve results in breakage of the sleeve; and the sleeve rarely if ever takes the same position twice relatively to the shaft. These conditions not only militate against accurate centering and balance of the rotary assemblage in the first instance, but, by their destructive effects above set forth, they gradually aggravate initial inaccuracies.

A feature of the invention consists in a shaft having a rigid portion for centering and expanding an expansible sleeve, means for securing an annular tool in operative position on the sleeve, and means independent of the securing means for adjusting the sleeve to regulate its diameter and for maintaining the adjustment and at the same time permitting removal of the tool. This feature provides for removing and replacing the tool without disturbing the expansible sleeve in any way, avoids the causes of breaking the sleeve, and avoids the wear heretofore imposed upon the tapered portion of the shaft.

Other features of the invention are hereinafter described and claimed and are illustrated by the accompanying drawing, in which Fig. 1 is a longitudinal section including a portion of a shaft and means combined therewith for providing a mounting in accordance with this invention.

Figure 2:
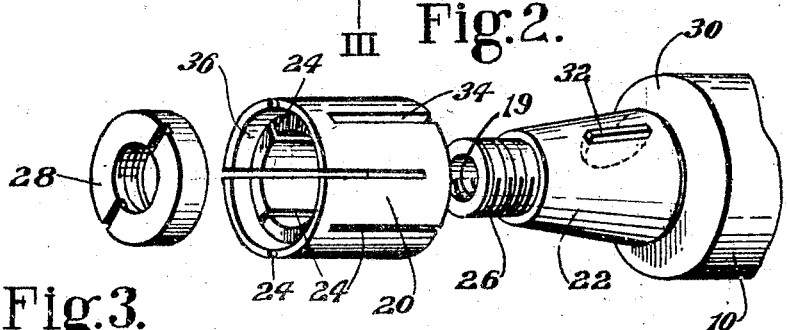
Figure 3:
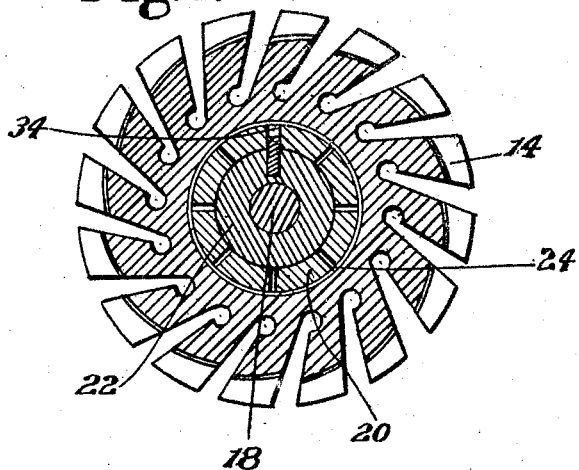

Fig. 2 is a perspective view of the same portion of the shaft, the expansible sleeve by which the tool is centered, and the nut for adjusting the sleeve to regulate its diameter, and Fig. 3 is a section in the plane indicated by line III—III in Fig. 1.

The shaft 10 is intended to be journaled in any suitable manner in a frame (not shown) and is intended to be driven at any rate of speed consistent with the character of the work to be performed by the tool. In machines for trimming the edges of shoe-soles it is customary to drive the shaft at a speed of 8000 R. P. M. or higher.

The tool 12 is typical of the style of tool most commonly used to trim the edge of a sole around the forepart. It is formed with a cylindric bore and with cutting teeth 14. The usual shield 16 is attached to the shaft 10, as heretofore, by a screw 18 and is used to secure the tool on its mounting. For this purpose the shaft is bored axially and tapped to provide an internal screw-thread 19 with which the screw 18 may cooperate.

The mounting for the tool 12 comprises an expansible circular sleeve 20 of hardened steel, the exterior of which is cylindric and the internal surface of which is tapered. The axial dimension of the sleeve is preferably less than that of the bore of the tool 12 to provide for axial adjustment of the sleeve and at the same time insure a slight projection of the ends of the tool beyond the ends of the sleeve, as shown in Fig. 1. Thus, the greater length of the tool provides for securing the latter to the shaft, as hereinafter explained, without affecting the adjustment of the sleeve. The shaft 10 is formed with a rigid tapered circular portion 22 by which both ends of the sleeve 20 are engaged and expanded equally and positively centered. Provision for such expansion of the sleeve is made by forming it with a plurality of cuts or kerfs 24 extending lengthwise from each end nearly but not quite to the opposite end, those starting at one end being located between those that start at the other end.

The invention provides improved means for forcing the sleeve 20 toward the larger end of the tapered portion 22 to regulate and maintain its diameter. In the illustrated construction the shaft 10 is provided with a small extremity 26 (Fig. 2) projecting from the tapered portion 22 and this extremity is provided with an external screw-thread on which an adjusting nut 28 operates. The nut acts directly on the sleeve 20 and is small enough to pass through the bore of the tool 12. As shown by Figs. 1 and 2, the sleeve 20 is counterbored to provide a chamber 36 for the reception of the nut 28, and the nut is arranged to lie wholly within the bore of the tool when the latter is mounted.

The shaft 10 has a shoulder 30 to provide a seat against which the inner end of the tool 12 may abut as shown in Fig. 1. The shoulder 30 and the shield 16 constitute cooperative clamping elements by which the tool is secured to the shaft so that it will rotate therewith. It is also to be observed that the tightening of the screw 18 to secure the tool does not affect the expansible sleeve 20, nor does the turning of the screw tend to turn the nut 28.

Although the friction between the sleeve 20 and the tapered portion 22 is sufficient to prevent the sleeve from turning relatively to the shaft so long as the sleeve is maintained in an expanded condition, I prefer to provide means to prevent assembling the sleeve and the shaft in more than one relation, for after the sleeve has been trued it is desirable to maintain one relation for the sake of concentricity and balance. For this purpose the tapered portion 22 may be provided with a key 32 thicker than all the cuts or kerfs 24 except one which may be made wide enough to receive the key. The keyway thus provided is indicated at 34.

An advantage of the illustrated construction is that the expansible sleeve 20 will be expanded uniformly at both ends. Another advantage is that the several relatively movable portions of the sleeve will be expanded and centered positively by the rigid tapered portion 22 of the shaft so that even if one or more of the resilient portions of the sleeve are stiffer than the others their greater strength will not affect the concentricity of the tool.

The preferred procedure in setting up the apparatus for use is to place the sleeve 20 on the shaft and the tool on the sleeve, to screw the nut 28 against the sleeve and thereby expand the latter only enough to take up the clearance in the bore of the tool but not enough to grip the tool, and finally to attach the shield 16 and the screw 18 and set them up with sufficient pressure to clamp the tool against the shoulder 30 of the shaft. Thus, while the sleeve positively centers the tool at both ends, it does not obstruct axial movement or removal of the tool. To release the tool for detachment it is only necessary to take out the screw 18. The sleeve, having once been regulated as above explained, will remain so even while the tool is being removed and replaced, since its periphery has uniform diameter from end to end.

Having thus described my invention, what I claim as new and desire to secure by Letters Patent of the United States is:

1. A mounting for an annular tool, comprising a shaft, an externally cylindric sleeve for holding and centering the tool, said sleeve being kerfed and uniformly expansible at both ends and said shaft having a sleeve-holding portion tapered to engage, center and expand said sleeve at both ends, means for securing the tool on said sleeve, and means independent of said securing means for maintaining the sleeve in expanded condition on said portion.

2. A mounting for an annular tool having a cylindric bore, comprising a shaft, an externally cylindric sleeve for holding and centering the tool, said sleeve being kerfed and expansible at both ends and being internally tapered at both ends and formed to fit said bore, said shaft having a rigid tapered portion formed to hold, center and expand said sleeve at both ends, means carried by the shaft for adjusting said sleeve to regulate its effective diameter, and means independent of said adjusting means to secure the tool on said sleeve.

3. In combination, a shaft having a tapered portion, an externally cylindric and internally tapered expansible sleeve provided with kerfs and fitted to said portion to hold and center a tool having a cylindric bore, means for adjusting said sleeve to regulate its diameter to such bore, and means independent of said sleeve to secure the tool to said shaft.

4. A shaft, an expansible kerfed sleeve carried thereby for centering an annular tool, said shaft and said sleeve having cooperative tapering surfaces to expand both ends of said sleeve, detachable means of larger diameter than said sleeve for cooperating with said shaft to secure the tool in operative position on said sleeve, and means carried by said shaft and of a size smaller than the bore of the tool for adjusting said sleeve relatively to the shaft to regulate its diameter and for maintaining the adjustment of the sleeve while the tool is being detached therefrom.

5. A mounting for an annular tool, comprising a shaft, a sleeve for centering the tool, said sleeve being kerfed and expansible at both ends and a portion of said shaft being formed to extend through and engage the sleeve, said portion being tapered to center and expand both ends of said sleeve, means smaller than the bore of the tool and formed and arranged to pass through the bore of the tool and to cooperate with said shaft to adjust said sleeve axially on said tapered portion, and means arranged to cooperate with said shaft independently of said adjusting means to secure the tool in operative position on said sleeve.

6. In combination, a shaft having a shoulder, a tapered portion projecting from said shoulder, and an externally threaded portion projecting from said tapered portion, an externally cylindric sleeve kerfed at both ends and formed to pass through and engage a cylindric bore in an annular tool and to be expanded at both ends by said tapered portion of the shaft to conform to the diameter of said bore, a nut smaller than the bore of the tool to cooperate with said threaded portion and to abut one end of said sleeve and thereby maintain said sleeve in an expanded condition on said tapered portion while the tool is being mounted on or demounted from said sleeve, and means for cooperatively engaging the tool and said shaft to clamp the tool axially against said shoulder.

7. A mounting for an annular tool, comprising a shaft having an external shoulder and a tapered portion projecting therefrom, an internally tapered sleeve fitted to said tapered portion, both ends of said sleeve being kerfed and small enough to go through the bore of said tool and to be expanded by said tapered portion of the shaft, means engaging said shaft to clamp the tool axially against said shoulder, and means independent of said clamping means to adjust said sleeve axially on said tapered portion of the shaft.

8. A mounting for an annular tool, comprising a shaft having an internal screw-thread, an external screw-thread and a tapered portion, an expansible kerfed sleeve fitted to said tapered portion to occupy the bore of the tool and center the latter, a nut on said external screw-thread to adjust said sleeve axially on said tapered portion, and means for engaging the tool and for cooperating with said internal screw-thread to secure the tool to the shaft.

9. A mounting for a tool having a cylindric bore, comprising a shaft, an externally cylindric sleeve for engaging said bore to center both ends of the tool, said sleeve being internally tapered at both ends and kerfed at both ends to provide for expansion and said shaft having a rigid portion tapered to expand both ends of said sleeve, means smaller than the bore of the tool and engaging said shaft and said sleeve to adjust said sleeve axially and thereby regulate its diameter, and means carried by the shaft and arranged to engage the ends of said tool to secure it to said shaft.

10. A mounting for an annular tool, comprising a shaft having a rigid circular portion, a circular sleeve axially adjustable on said portion of the shaft, said sleeve being kerfed and expansible at both ends and said portion of the shaft being tapered to expand and center both ends of the sleeve, means for preventing relative turning of the shaft and said sleeve, means arranged to adjust the sleeve axially and thereby regulate its diameter, said sleeve and said adjusting means being smaller than the bore of the tool and capable of passing through the bore while said adjusting means maintains the diametral regulation of the sleeve, and means arranged to secure the tool to said shaft.

11. A mounting for an annular tool, comprising a shaft, a sleeve for centering the tool, said sleeve being internally tapered at both ends and having kerfs extending lengthwise from both ends to afford expansibility at both ends, one of said kerfs being wider than the others, said shaft having a rigid portion externally tapered to center and expand the seeve at both ends, a key embedded in said rigid portion to occupy only said wider one of said kerfs, and means for adjusting said sleeve axially to regulate its diameter.

12. A shaft having a rigid frusto-conical portion, an internally tapered sleeve arranged on said portion, said sleeve having kerfs intersecting its ends to render them expansible and the periphery of said sleeve being of uniform diameter from end to end, means of smaller diameter than said sleeve for adjusting the latter axially to regulate its effective diameter, and means for fastening to said shaft an internally cylindric tool surrounding both ends of said sleeve.

13. A shaft having a rigid frusto-conical portion and a shoulder adjacent to the larger end thereof, an internally tapered sleeve arranged on said portion, said sleeve having kerfs intersecting its ends to render them expansible and the periphery of said sleeve being of uniform diameter from end to end, means of smaller diameter than said sleeve for adjusting the latter axially to regulate its effective diameter, and means arranged to act against one end of an internally cylindric tool arranged on said sleeve to secure the tool against said shoulder and against turning relatively to said shaft.

14. In combination, a tool having a cylindric bore, an externally cylindric and internally tapered sleeve both ends of which are arranged in said bore, said ends being intersected by kerfs to render them expansible, a shaft having a shoulder to engage one end of said tool and having a tapered portion extending through and engaging said sleeve, means of smaller diameter than said sleeve to adjust the latter axially and thereby regulate its effective outside diameter at both ends according to said bore, and means for securing said tool against said shoulder and against turning relatively to said shaft.

In testimony whereof I have signed my name to this specification.

EUGENE J. RAY.